April 22, 1958

C. E. MYRON 2,831,499

CHECK VALVE

Filed Sept. 7, 1954

INVENTOR.
C. E. MYRON

BY *S. Tierney Jr.*

ATTORNEY

April 22, 1958

C. E. MYRON 2,831,499

CHECK VALVE

Filed Sept. 7, 1954

INVENTOR.
C.E. MYRON
BY S. Tierney Jr.
ATTORNEY

United States Patent Office 2,831,499
Patented Apr. 22, 1958

2,831,499

CHECK VALVE

Clayton E. Myron, Seattle, Wash., assignor to Rohr Aircraft Corporation, Chula Vista, Calif., a corporation of California Application September 7, 1954, Serial No. 454,478

3 Claims. (Cl. 137—512.1)

This invention relates to a check valve adapted for use in checking the flow of air or other gas in a pneumatic system and especially in one passing a large volume of hot gas. Such systems are used in airplanes in which the air compressors of several engines are connected to a common duct system. In such a system a check valve is required at the outlet of each compressor to prevent the back flow of compressed air into the compressor from the duct system when the engine driving the compressor slows down or stops.

Such a check valve should close and open quickly in response to changes in pressure and gas flow and should be light in weight especially when used in aircraft. It is a main purpose of my invention to provide a valve which meets these requirements and yet consists of few parts and is inexpensive to construct.

Another object of the invention is to provide a check valve of the type described capable of passing a large volume of hot air or other gas for an extended period of time without corrosion.

A further object is to provide a check valve in which the gas passage is closed by two similar flaps moving in opposite directions through an angle of substantially 45 degrees.

Another object is to provide a check valve having an enclosing casing which confines the gas flow and in which the valve seats may be machined on a member extending into the casing before it is assembled with the casing.

Further objects will become apparent as the description of the valve proceeds. For a better understanding of the invention reference is made to the accompanying drawing, in which.

Figure 1:
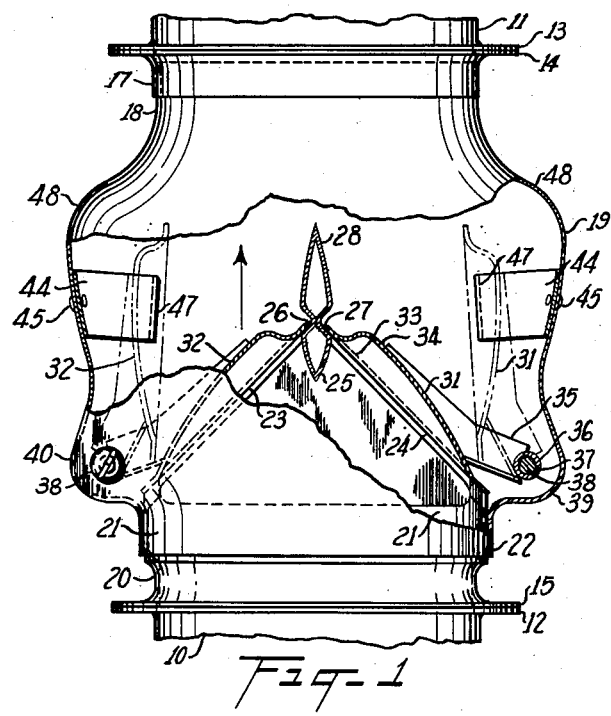
Fig. 1 is a top view, partly in section, of a check valve embodying the invention.
Figure 2:
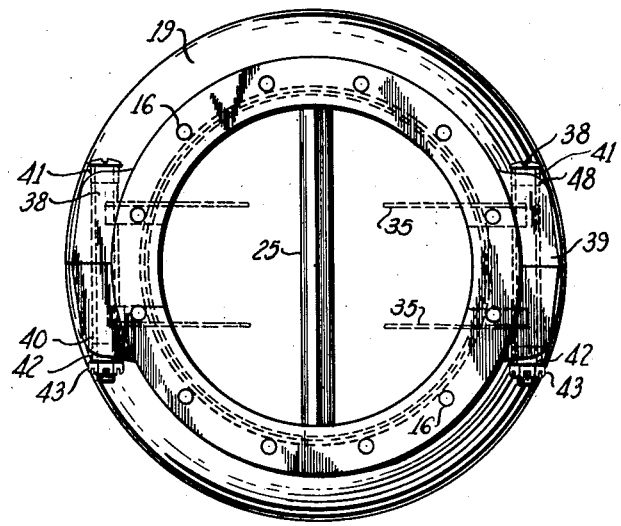
Fig. 2 is an end view of the valve of Fig. 1.
Figure 3:
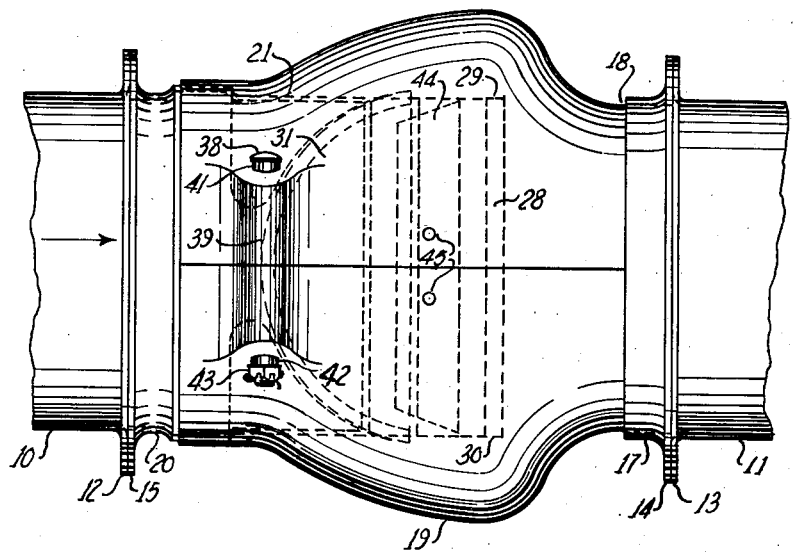
Fig. 3 is a side view of the valve of Fig. 1.
Figure 4:
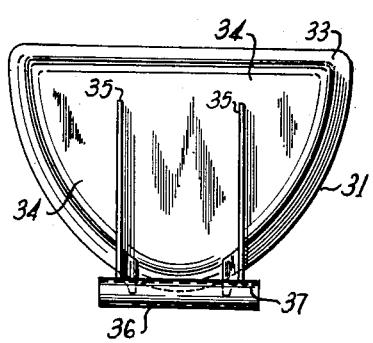
Fig. 4 is a side view of one of the flaps of the valve.
Figure 5:
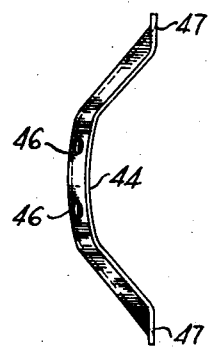
Fig. 5 is a perspective view of a stop used in the valve for each flap.

Referring to Figs. 1 and 3, the invention is shown in connection with a check valve adapted to permit the flow of compressed air from a cylindrical pipe 10 to a cylindrical pipe 11, several similar pipes 11 being connected to a common manifold (not shown). Hot compressed air at a temperature of the order of 700° F. is supplied to pipe 10 by the rotary air compressor of a turbine driven airplane engine (not shown), such air passing through the check valve in the direction of the arrow, but the valve preventing the passage of hot gas backwards from the manifold into pipe 10 in a manner to be later described. Pipes 10 and 11 terminate in thin circular flanges 12, 13 adapted to be clamped to similar flanges 14, 15 by sets of bolts (not shown) passing through holes 16 drilled in the flanges. Flange 14 is integral with a circular collar 17 which fits the outside of the cylindrical end portion 18 of valve housing or casing 19 and is hermetically sealed thereto by welding. Flange 15 is part of a hollow steel casting 20 whose body portion 21 is cylindrical and has welded thereto the cylindrical inlet end 22 of casing 19. Body portion 21 has its downstream end machined to provide two valve seats 23, 24 inclined to each other at an angle of 90 degrees, the tapered rear ends being connected by a vertical hollow member 25 of streamlined shape. The vertical faces 26, 27 of member 25 are machined to provide the straight downstream end portions of the semi-elliptical valve seats 23, 24, the straight and curved portions of each valve seat lying in a common plane. Member 25 terminates at its downstream end in a hollow streamlined ridge 28 whose top and bottom ends 29, 30 are spaced from casing 19 by a substantial amount (see Fig. 3). The two semi-elliptical openings in casting 20 thus have a total area greater than the internal cross sectional area of pipe 10.

A pair of similar valve flaps 31, 32 are provided to cover valve seats 23, 24, each flap having along its margin a semi-elliptical flat face 33 adapted to be pressed against its seat. Each flap is preferably made of stainless sheet steel and is dished outwardly, as shown in Fig. 1, to stiffen it. To the dished portion 34 are welded two ribs 35 whose outer ends are welded to a cylindrical support rod 36 having a drilled hole 37 to receive a vertical pivot bolt 38. The sides of casing 19 are bent out to provide offset portions 39, 40 to each of which is welded a pair of vertically aligned bosses 41, 42 which, together with the offset portions, are drilled to receive the bolts 38. Each bolt is secured by the usual nut 43.

To limit the outward movement of flaps 31, 32 and prevent them from striking against casing 19 and wearing it away, a pair of similar stops 44 are provided, each stop being bow shaped and secured to casing 19 by a pair of rivets 45 passing through holes 46 in the stop and corresponding holes in the casing. The flat portion of the flap adjacent its edge strikes against the inwardly bent ends 47 of its stop when the flap is fully open, and the ends 47 bend somewhat to cushion the impact.

The valve is especially adapted for use in pipe lines of 3 inch diameter and larger and when used for hot compressed air, the parts are preferably made of stainless steel. Bleed air from the compressor at a pressure as high as 200 p. s. i. and a temperature up to 700° F. enters the valve through pipe 10 and the pressure causes the flaps 31, 32 to leave their valve seats 23, 24 and move out against stops 44 into the position indicated in dash lines in Fig. 1. In this position, the flaps are substantially out of the moving gas stream and offer substantially no impediment to the free flow thereof through the valve.

Should the pressure in pipe 10 decrease, and air start to flow from pipe 11 into the valve, the flared out wall 48 of casing 19 directs a portion of the entering air against the outer faces of flaps 31, 32 and causes the flaps to quickly move in against their seats 23, 24 and close the valve. Since both flaps pivot about vertical axes, the air does not have to lift either flap so that the flaps move very easily in response to changes in air flow and are not restrained by gravity or springs against movement in either direction. By making most of the parts of stainless sheet steel, the valve is strong yet light in weight so that it is especially suited for use in the pneumatic duct systems of airplanes.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims and all changes which come within the meaning and range of equivalency of the claims are intended to be embraced therein.

Having thus described my invention, what I claim as new and useful and desire to secure by Letters Patent is:

1. A check valve adapted to convey a hot gas stream in one direction horizontally and prevent its return in the opposite direction comprising, in combination: a hollow imperforate sheet metal casing having horizontally aligned cylindrical inlet and outlet ends and an outwardly flared portion connecting said ends; a thin metal tube having a cylindrical portion hermetically sealed to said inlet end and a substantially cylindrical portion projecting horizontally a substantial distance within said outwardly flared portion of the casing; a vertically disposed straight narrow bar secured to the downstream end of said tube and passing through the axis thereof, said bar and the wall of said tube being machined to provide a pair of continuous flat valve seats which lie in two intersecting vertical planes which converge toward the outlet end of said casing; a pair of thin rigid metal flaps seated against said valve seats and having extensions projecting outward into said outwardly flared casing portion; a pair of vertically disposed long pivotal supports passing through said projecting extensions and said outwardly flared casing portion, said pivotal supports being constructed to permit free movement of said flaps away from said valve seats in response to the flow of hot gas into the inlet end of said casing; a pair of bow-shaped thin metal stops; and means for securing the center portion only of each stop against the side of said casing to hold the ends of the stop in vertical alignment with each other for simultaneous engagement by the edge portion of a flap as the flap approaches the side of the casing.

2. A check valve as claimed in claim 1, in which said casing is provided near its downstream end with an outwardly flared curved interior wall constructed to deflect a portion of a stream of gas entering the outlet end of the casing against the outer faces of said metal flaps when the flaps are in contact with said stops to advance the flaps against said valve seats.

3. A check valve as claimed in claim 1, in which said flaps while abutting said stops are substantially out of the gas stream passing through said tube and casing.

References Cited in the file of this patent

UNITED STATES PATENTS

| | | |
|---|---|---|
| 1,632,385 | Vollman | June 14, 1927 |
| 1,673,831 | Kuehne | June 19, 1928 |
| 2,157,554 | McFarlin | May 9, 1939 |
| 2,419,318 | Johnson | Apr. 22, 1947 |
| 2,508,615 | Lukes | May 23, 1950 |

FOREIGN PATENTS

| | | |
|---|---|---|
| 1,033 | Holland | of 1916 |